(«12») United States Patent
Detor et al.

(10) Patent No.: US 10,724,940 B2
(45) Date of Patent: Jul. 28, 2020

(54) SYSTEM FOR MONITORING AND CONTROLLING EQUIPMENT LIFE DUE TO CORROSION DEGRADATION

(71) Applicant: General Electric Company, Schenectady, NY (US)

(72) Inventors: Andrew Joseph Detor, Burnt Hills, NY (US); Bernard Patrick Bewlay, Niskayuna, NY (US); Monica Soare, Niskayuna, NY (US); Kevin Harding, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 444 days.

(21) Appl. No.: 15/635,875

(22) Filed: Jun. 28, 2017

(65) Prior Publication Data
US 2019/0003954 A1   Jan. 3, 2019

(51) Int. Cl.
*G01N 17/04* (2006.01)
*G01N 17/00* (2006.01)
(Continued)

(52) U.S. Cl.
CPC ........... *G01N 17/04* (2013.01); *F01D 25/007* (2013.01); *G01N 17/00* (2013.01); *G05B 15/02* (2013.01);
(Continued)

(58) Field of Classification Search
CPC . G05B 15/02; G05B 23/0254; F05D 2220/32; F05D 2220/323; F05D 2260/80;
(Continued)

(56) References Cited

U.S. PATENT DOCUMENTS

| 5,315,234 A | 5/1994 | Sutton, Jr. et al. |
| 5,345,514 A | 9/1994 | Mahdavieh et al. |

(Continued)

FOREIGN PATENT DOCUMENTS

| CA | 2831142 A1 | 5/2014 |
| EP | 1353252 A2 | 10/2003 |

(Continued)

OTHER PUBLICATIONS

4D Technology Corporation; "The New 4D InSpec Surface Gauge is here!", 4D InSpec Surface Gauge, https://www.4dinspec.com/, 2017, (2 pages).

(Continued)

*Primary Examiner* — Gregory J Toatley, Jr.
*Assistant Examiner* — Lynda Dinh
(74) *Attorney, Agent, or Firm* — Christopher R. Carroll; The Small Patent Law Group LLC

(57) ABSTRACT

A corrosion maintenance scheduling and implementation system and method measure one or more characteristics of corrosion in equipment before and after implementation of a corrosion remediation action, determine one or more of a change in the one or more characteristics of the corrosion between before and after implementation of the corrosion remediation action, one or more historical operational characteristics of the equipment, or one or more forthcoming operational characteristics of the equipment, and modify a schedule of the corrosion remediation action for the equipment based on one or more of the one or more characteristics of corrosion that are measured, the change in the one or more characteristics of the corrosion, the one or more historical operational characteristics of the equipment, and/or the one or more forthcoming operational characteristics of the equipment.

17 Claims, 2 Drawing Sheets

(51) Int. Cl.
*G05B 15/02* (2006.01)
*G01M 15/14* (2006.01)
*F01D 25/00* (2006.01)
*G05B 23/02* (2006.01)
*F01D 21/00* (2006.01)

(52) U.S. Cl.
CPC ........ *G05B 23/0254* (2013.01); *F01D 21/003* (2013.01); *F05D 2220/323* (2013.01); *F05D 2260/80* (2013.01); *F05D 2260/82* (2013.01); *F05D 2260/95* (2013.01); *G01M 15/14* (2013.01)

(58) Field of Classification Search
CPC ............. F05D 2260/83; F05D 2260/95; F05D 21/003; F05D 25/007; G01M 15/14; G01N 17/04; G01N 17/00
See application file for complete search history.

(56) References Cited

U.S. PATENT DOCUMENTS

| | | | |
|---|---|---|---|
| 6,792,357 | B2 | 9/2004 | Menon et al. |
| 7,317,992 | B2 | 1/2008 | Fascinato et al. |
| 7,689,003 | B2 | 3/2010 | Shannon et al. |
| 7,925,454 | B1 | 4/2011 | Narcus |
| 8,209,839 | B1 | 7/2012 | Brostmeyer et al. |
| 8,240,042 | B2 | 8/2012 | Williams et al. |
| 8,428,910 | B2 | 4/2013 | Papadimitriou et al. |
| 8,818,078 | B2 | 8/2014 | Telfer et al. |
| 8,858,717 | B2 * | 10/2014 | Fan ...................... C09D 193/00 134/10 |
| 2006/0288756 | A1 * | 12/2006 | De Meurechy ...... G01N 17/006 73/1.01 |
| 2009/0011963 | A1 * | 1/2009 | Anderson ............ C10M 163/00 508/192 |
| 2012/0279599 | A1 | 11/2012 | Gluskin et al. |
| 2014/0039648 | A1 * | 2/2014 | Boult ..................... G05B 15/02 700/79 |
| 2014/0119984 | A1 * | 5/2014 | Belakshe ................ E21B 41/02 422/12 |
| 2016/0069789 | A1 | 3/2016 | Pensado et al. |
| 2016/0102554 | A1 | 4/2016 | Cornell |
| 2016/0196643 | A1 | 7/2016 | Bendall |

FOREIGN PATENT DOCUMENTS

| | | |
|---|---|---|
| EP | 1353252 A3 | 11/2003 |
| EP | 3029275 A1 | 6/2016 |
| WO | 2014018288 A1 | 1/2014 |
| WO | 2016191166 A1 | 12/2016 |

OTHER PUBLICATIONS

4D Technology Corporation; "4D InSpec Surface Gauge", 4D InSpec Surface Gauge, www.4DTechnology.com, 2016, (2 pages).
4D Technology Corporation; "4D InSpec Faq (Frequently Asked Questions)", https://www.4dinspec.com/products/4d-inspec-faq/, 4D InSpec Surface Gauge, 2017, (7 pages).
4D Technology Corporation; "4D InSpec Applications", https://www.4dinspec.com/applications/, 4D InSpec Surface Gauge, 2017, (5 pages).
4D Technology Corporation; "4D InSpec Options", https://www.4dinspec.com/products/options/, 4D InSpec Surface Gauge, 2017, (5 pages).
4D Technology Corporation; "Revolutionary new measurement tool for the shop floor.", https://www.4dinspec.com/products/4d-inspec/, 4D InSpec Surface Gauge, 2017, (4 pages).
4D Technology Corporation; "Powerful, easy to use analysis for 4D InSpec.",https://www.4dinspec.com/products/4d-inspec-software/, 4D InSpec Surface Gauge, 2017, (6 pages).
Office Action dated Apr. 12, 2019 for corresponding Canadian Patent Application No. 3,008,341.
Office Action dated Mar. 10, 2020 for corresponding Canadian Patent Application No. 3,008,341.
Extended European Office Action dated Apr. 16, 2019 for corresponding European Patent Application No. 18179533.7.
Office Action dated Dec. 3, 2019 for corresponding European Patent Application No. 18179533.7.

* cited by examiner

SYSTEM FOR MONITORING AND CONTROLLING EQUIPMENT LIFE DUE TO CORROSION DEGRADATION

FIELD

The subject matter described herein relates to monitoring corrosion of equipment, such as turbine engines or other equipment.

BACKGROUND

Equipment that includes metal components can corrode over time. The corrosion can develop pitting in the equipment, which eventually can lead to cracks in the equipment and eventual failure of the equipment. Equipment may be scheduled for periodic inspection to check on the existence and/or progression of corrosion. But, this periodic inspection of corrosion may only examine the propagation of cracks and/or may only measure a single corrosion pit, and not examine other aspect of corrosion. As a result, predictions of how much longer the equipment can continue to safely operate (e.g., the remaining useful service life of the equipment) may be inaccurate.

BRIEF DESCRIPTION

In one embodiment, a method includes measuring one or more characteristics of corrosion in equipment before and after implementation of a corrosion remediation action, determining one or more of a change in the one or more characteristics of the corrosion between before and after implementation of the corrosion remediation action, one or more historical operational characteristics of the equipment, or one or more forthcoming operational characteristics of the equipment, and modifying a schedule of the corrosion remediation action for the equipment based on one or more of the one or more characteristics of corrosion that are measured, the change in the one or more characteristics of the corrosion, the one or more historical operational characteristics of the equipment, and/or the one or more forthcoming operational characteristics of the equipment.

In one embodiment, a system includes one or more processors configured to obtain measurements of one or more characteristics of corrosion in equipment before and after implementation of a corrosion remediation action. The one or more processors also are configured to determine one or more of a change in the one or more characteristics of the corrosion between before and after implementation of the corrosion remediation action, one or more historical operational characteristics of the equipment, and/or one or more forthcoming operational characteristics of the equipment. The one or more processors are configured to modifying a schedule of the corrosion remediation action for the equipment based on one or more of the one or more characteristics of corrosion that are measured, the change in the one or more characteristics of the corrosion, the one or more historical operational characteristics of the equipment, and/or the one or more forthcoming operational characteristics of the equipment.

In one embodiment, a method includes measuring one or more characteristics of corrosion in equipment before and after implementation of a corrosion remediation action, determining a change in the one or more characteristics of the corrosion between before and after implementation of the corrosion remediation action, determining upcoming growth of the corrosion in the equipment based on the one or more characteristics of the corrosion that are measured and forthcoming operational characteristics of the equipment, and modifying a schedule of the corrosion remediation action for the equipment based on the upcoming growth of the corrosion that is determined and the forthcoming operational characteristics of the equipment.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein provide systems and methods that monitor equipment for corrosion, operational characteristics, etc., and determine schedules for remediation actions based on the corrosion, operational characteristics, etc. of the equipment that are monitored. While the description herein can determine remediation schedules for engine turbines, the systems and methods can be used to determine remediation schedules for other types of equipment, such as other vehicle components, bridges, rails, or the like.

The systems and methods can characterize corrosion of the equipment based on optical measurements of corrosion pits in the equipment. For example, the systems and methods can use multi-dimensional surface information regarding the corrosion pit population (including depths, widths, and/or aspect ratios of the pits) to quantify stress concentrations associated with a field of corrosion pits. The aspect ratio for a corrosion pit can be the ratio of the width of the pit to the depth of the pit.

Figure 1:
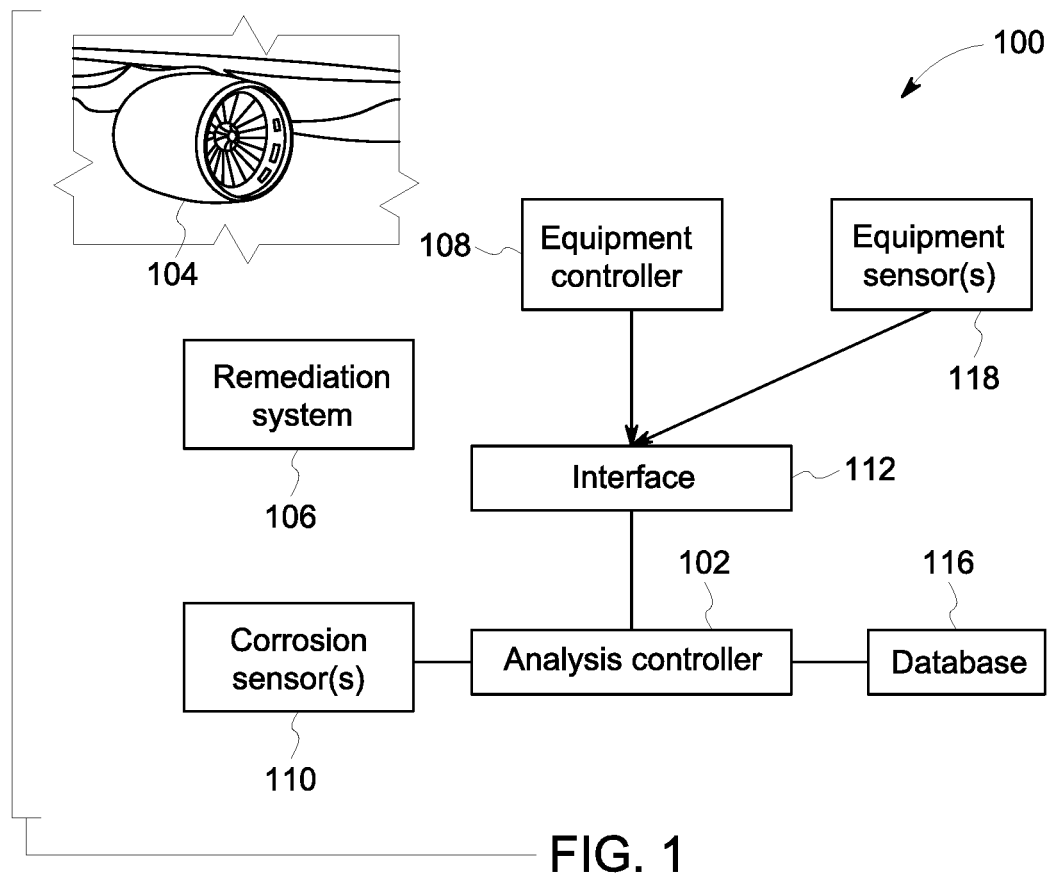
FIG. 1 illustrates one embodiment of a corrosion monitoring system.

FIG. 1 illustrates one embodiment of a corrosion monitoring system 100. The system 100 includes an analysis controller 102 that monitors equipment performance parameters and predicts corrosion degradation of equipment 104, such as a turbine engine of an aircraft (or another type of engine, another engine for another type of vehicle, or another type of equipment other than an engine). Responsive to predicting corrosion degradation, the analysis controller 102 can automatically implement and/or schedule one or more responsive actions, which also can be referred to as remedial actions. These responsive actions can be performed without removing the equipment 104 from the powered system to which the equipment 104 is coupled, such as the aircraft or wing of the aircraft. With respect to a surface-mounted equipment 104 (e.g., a turbine mounted on a surface of the ground, a ship, or another surface), the responsive actions can be performed without removing the equipment 104 from the surface to which the equipment 104 is mounted.

A remediation system 106 represents one or more hardware components that change a state of the equipment 104 to reduce the effect of further corrosion. For example, the remediation system 106 can include a cleaning system that applies water, air, or the like, to remove corrosive species from the equipment 104. The remediation system 106 can include a spraying device that adds coatings to the equipment 104, including corrosion mitigation coatings. The remediation system 106 can include a sanding or abrasive device that sands corrosion off the equipment 104 or blends the corrosion.

Optionally, the remediation system 106 can be a scheduling system that changes a schedule of the vehicle to avoid city-to-city flight paths that involve exposure to dust that causes hot corrosion. As another example, the remediation system 106 can communicate with an equipment controller 108 that controls operation of the equipment 104. The equipment controller 108 can modify operating parameters of the equipment 104, such as to de-rate the equipment 104, to reduce an upper limit on an operating temperature of the equipment 104, and/or to otherwise reduce stresses of the equipment 104 to reduce the rate of corrosion.

The analysis controller 102 and/or equipment controller 108 represent hardware circuitry that includes and/or is connected with one or more processors (e.g., one or more microprocessors, field programmable gate arrays, and/or integrated circuits) that perform the associated operations described herein. Optionally, the analysis controller 102 and/or equipment controller 108 can include one or more processors (e.g. a controller, microprocessor, microcontroller, digital signal processor, etc.), one or more memories, one or more input/output subsystems, one or more laptop computers, one or more mobile devices (e.g., a tablet computer, smart phone, body-mounted device or wearable device, etc.), one or more servers, one or more enterprise computer systems, one or more networks of computers, etc. In one embodiment, the equipment controller 108 includes a full authority digital engine controller (FADEC), a component thereof, or as a separate module in communication with the FADEC (e.g., via one or more electronic communication links or networks). In some embodiments, the equipment controller 108 monitors a range of equipment characteristics, such as the frequency of data acquisition and communication with the analysis controller 102.

The controllers 102, 108 can communicate with each other via one or more networks. The network(s) may be, for example, a cellular network, a local area network, a wide area network (e.g., Wi-Fi), a cloud, a virtual personal network (e.g., VPN), a cloud, an Ethernet network, and/or a public network such as the Internet. The controllers 102, 108 can include and/or communicate with each other via communication subsystems. The communication subsystems may enable shorter-range wireless communications between the controllers 102, 108 using, for example, BLUETOOTH and/or other technology. The communication subsystems may include one or more optical, wired and/or wireless network interface subsystems, cards, adapters, or other devices, as may be needed pursuant to the specifications and/or design of the controllers 102, 108.

One or more corrosion sensors 110 can optically measure characteristics of corrosion in or on the equipment 104. In one embodiment, the corrosion sensor 110 includes an optical sensor that measures multi-dimensional information on corrosion in the equipment. This information can include locations and/or sizes of the corrosion pits in the equipment 104. The corrosion sensor 110 can include a structured light sensor that generates several points of light that are reflected off the equipment 104 and that measures reflection of the points of light. Based on changes in the emitted and detected points of light, the corrosion sensor 110 can detect interruptions in smooth surfaces of the equipment 104.

A corrosion pit can be characterized by several characteristics that represent multi-dimensional information about the corrosion pit. These characteristics can include a location of the pit (e.g., the absolute location on a surface of the equipment 104 and/or a location of the pit relative to another pit). The characteristics can include a depth measurement that is a distance that the pit extends into the equipment 104 from the surface. Another characteristic can include a width measurement that is a distance that the pit extends along one or more directions that are perpendicular to the direction in which the depth is measured. Another characteristic can include an aspect ratio, which is the width of the pit divided by the depth of the pit. Another characteristic of the pit can be a volume of the pit. Other characteristics of the pit optionally may be measured, such as an area of the pit (e.g., a size or fraction of the area of the surface of the equipment 104 that is replaced by the pit or over which the pit extends), a spacing of the pit (e.g., a distance between the pit and one or more neighboring pits), etc.

Optionally, the sensor 110 can represent another type of source of characteristics of the corrosion pits in the equipment 104. For example, the sensor 110 can represent an input (e.g., a keyboard, touchscreen, stylus, electronic mouse, antenna, etc.) that is used to provide or receive the characteristics of corrosion pits from a source such as an operator that measured the characteristics. This input can be received via an interface 112 (described below). The pit characteristics can be communicated from the sensor 110 and/or interface to the analysis controller 102, or optionally can be stored in one or more computer readable memories 116, ("Database" in FIG. 1), such as one or more computer hard drives, optical discs, servers, or the like.

The analysis controller 102 also receives operational characteristics of the equipment 104. The interface 112 represents hardware circuitry that includes and/or is connected with one or more communication devices, such as transceiving circuitry, modems, antennas, or the like. The interface 112 receives one or more operational characteristics of the equipment 104 from the equipment controller 108. For example, the operational characteristics can be communicated via one or more wired and/or wireless connections between the equipment controller 108 and the interface 112. The interface 112 can communicate the operational characteristics to the analysis controller 102 and/or the database 116. The analysis controller 102 can obtain the pit characteristics and/or the operational characteristics from the database 116.

The operational characteristics can include engine operating parameters, such as throttle settings and/or how long one or more throttle settings were used. The operational characteristics can include routes over which the equipment 104 traveled. For example, if the equipment 104 is an engine of an aircraft, the operational characteristics can include flight paths, location pairs (e.g., the starting and ending locations for trips of the aircraft), or the like.

Another example of the operational characteristics includes environmental exposure, such as temperatures at which the equipment 104 operated, how long the equipment 104 operated at one or more of the temperatures, ambient temperatures to which the equipment 104 was exposed, how long the equipment 104 operated at one or more of the ambient temperatures, humidity to which the equipment 104 was exposed, how long the equipment 104 was exposed to the humidity, the amount of dust or other contaminants to which the equipment 104 was exposed, etc. In one embodiment, the environmental exposure or one or more of the operational characteristics can be provided from one or more equipment sensors 118. The equipment sensor 118 can include a thermocouple or other temperature sensitive device that measures operating temperatures of the equipment 104 and/or ambient temperatures, a hydrometer that measures humidity, a dust sensor that measures amounts of dust or other contaminants to which the equipment 104 was exposed, or the like. The dust sensor can include a source of satellite data that provides airborne particulate exposure of the equipment 104, such as the satellite itself, a database that stores the airborne particulate exposure measured by the satellite, or the like.

With respect to airline equipment 104, the measurement of the corrosion pits using the sensor 110 can be operated at an A check, C check, another procedure at an airport, or other location. The analysis controller 102 can store the measurements in the database 116. The database 116 also can store information related to the remediation action history of the equipment 104. This information can include the date of the last remediation action, the type of remediation action, etc.

The analysis controller 102 receives one or more of the corrosion pit characteristics and one or more of the operational characteristics of the equipment 104, and optionally performs a stress analysis of the equipment 104 based on the received characteristic(s) at the relevant operating conditions, such as engine operating speeds, temperatures, etc. The analysis controller 102 can use the corrosion characteristics to determine a stress distribution in the equipment 104 in the presence of corrosion pits 200.

The analysis controller 102 can perform a finite element analysis stress analysis to identify stress concentrations (e.g., locations or areas of the equipment 104 having stress above a designated threshold) on the surface of the equipment 104 for the specific measured pit geometries and locations. The stresses can be calculated using finite element analysis based on the locations of the corrosion pits 202, the pit characteristics, and/or the operational characteristics. In some situations, a full finite element analysis may not need to be performed to determine the stresses. Instead, empirical correlations or reduced order equations could be used to predict the stresses. Optionally, the stress analysis performed by the analysis controller 102 can include comparing the corrosion pit characteristics and/or operational characteristics with different designated corrosion pit characteristics and/or different designated operational characteristics. The different designated corrosion pit characteristics and/or different designated operational characteristics can be associated with different amounts of stress.

For example, larger volumes of corrosion pits, more corrosion pits, smaller aspect ratios of the corrosion pits, larger surface areas of corrosion pits, deeper corrosion pits, smaller distances between corrosion pits, hotter operating temperatures, longer exposure times of the equipment 104 to the elevated operating temperatures, more humid conditions to which the equipment 104 was exposed, longer exposure times of the equipment 104 to the humid conditions, more dust to which the equipment 104 was exposed, etc., can be associated with greater stresses on the equipment 104 than smaller volumes of corrosion pits, fewer corrosion pits, greater aspect ratios of the corrosion pits, smaller surface areas of corrosion pits, shallower corrosion pits, larger distances between corrosion pits, cooler operating temperatures, shorter exposure times of the equipment 104 to the elevated operating temperatures, less humid conditions to which the equipment 104 was exposed, shorter exposure times of the equipment 104 to the humid conditions, less dust to which the equipment 104 was exposed, etc.

The amounts of stress associated with the different characteristics can be stored in the database 116, and can be based on previous measurements of stress on other equipment 104 having the associated characteristics. The analysis controller 102 can determine different stresses for different sections of the equipment 104, such as different areas of the equipment 104. In one embodiment, the analysis controller 102 can determine stresses associated with individual corrosion pits in the equipment 104.

The analysis controller 102 can implement remediation to reduce the rate at which corrosion of the equipment 104 is increasing. Remediation actions implemented by the analysis controller 102 can include, for example, cleaning the equipment 104 to remove corrosive species, avoiding city-to-city flight paths of the equipment 104 that involve exposure to dust, modification of operating parameters of the equipment 104 to reduce the maximum operating temperatures and stresses of the equipment 104 to reduce the rate of corrosion, or the like. In one embodiment, the analysis controller 102 generates and communicates a control signal to the remediation system 106 responsive to the stresses determined by the analysis controller 102 exceeding a first designated threshold and/or the predicted residual life of the equipment 104 falling below a second designated threshold. The remediation system 106 can represent automatic cleaning equipment that automatically sprays a cleaning solution or that otherwise removes a corrosive species (e.g., salt) from the equipment 104 responsive to receiving the control signal from the analysis controller 102, such as a spray device or system controlled by the controller 102.

Optionally, the remediation system 106 can represent a scheduling system or dispatch facility that changes a schedule of a vehicle that includes the equipment 104 to prevent the vehicle and equipment 104 from traveling between locations or to a location that would result in the vehicle and equipment 104 moving through dust. Additionally or alternatively, the remediation system 106 represents a spray device or system that automatically applies one or more coatings to the equipment responsive to receiving the control signal from the analysis controller 102. For example, one or more corrosion mitigation coatings such as paints can be sprayed onto the equipment.

As another example, the analysis controller 102 can communicate the control signal to the equipment controller 108 to direct the equipment controller 108 to restrict the operational parameters of the equipment 104. For example, the equipment controller 108 may prevent the throttle of the equipment 104 from being increased above a threshold setting (that is less or lower than the maximum upper throttle of the equipment 104) to reduce the operating temperature and corrosion of the equipment 104. The analysis controller 102 can automatically lower upper limits on operation of the equipment 104 to control the amount and/or rate of growth of corrosion, such as by preventing the equipment 104 from operating at too hot of temperatures (which could create more corrosion or increase the rate at which corrosion in the equipment 104 is growing or developing).

The analysis controller 102 can obtain historical data about the equipment 104 or the history of the remediation actions implemented on the equipment 104, including data obtained during previous measurements of corrosion in the equipment 104. For example, the analysis controller 102 can obtain previously measured sizes of corrosion pits in the equipment 104, which remediation actions were implemented on the equipment 104 (and/or when the remediation actions were implemented), and/or previous operations of the equipment 104 from the database 116. The previous operations can indicate previous operational settings of the equipment 104 (e.g., throttle settings), previous temperatures of the equipment 104, routes that the equipment 104 traveled alone, and the like.

The analysis controller 102 can use some or all this historical information to determine whether to implement one or more remediation actions and/or to select a remediation action from among many different remediation actions to implement. For example, the analysis controller 102 can determine that the corrosion characteristics (e.g., the sizes of corrosion pits) alone do not warrant implementing a remediation action. But, the analysis controller 102 can examine historical measurements of the corrosion characteristics and determine that the corrosion characteristics are increasing at a rapid rate, such as when the aspect ratio of the corrosion pits 200 are decreasing by at least a designated rate. Even though the analysis controller 102 may not implement a remedial action due to the recently measured corrosion characteristic(s), the analysis controller 102 may determine that the rate of change in the corrosion characteristic(s) is sufficiently large that a remedial action is to be implemented.

Figure 2:
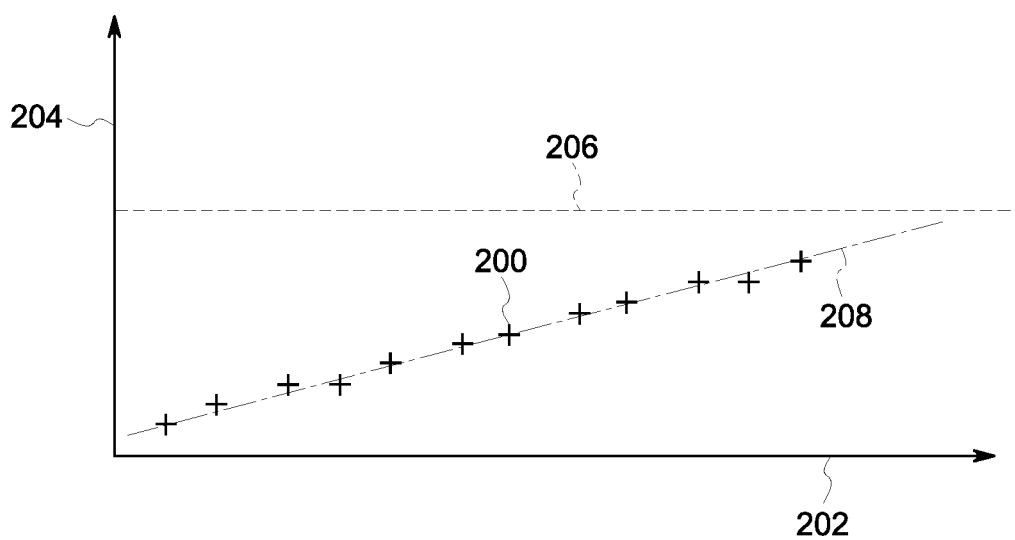
FIG. 2 illustrates examples of corrosion pit characteristics examined by an analysis controller shown in FIG. 1 to determine whether to implement one or more remedial actions.

FIG. 2 illustrates examples of corrosion pit characteristics 200 examined by the analysis controller 102 to determine whether to implement one or more remedial actions. The characteristics 200 can represent previously measured depths, widths, aspect ratios (or inverse values of the aspect ratios), distances between pits (or inverse values of the distances), etc. The characteristics 200 are shown alongside a horizontal axis 202 representative of time and a vertical axis 204 representative of increasing values of the characteristics 200. The analysis controller 102 may not automatically implement a remediation action on equipment 104 responsive to the characteristics 200 remaining at or below a designated limit 206. For example, the analysis controller 102 does not implement a remediation action on the equipment 104 while the inverse value of the corrosion pit aspect ratio remains smaller than the limit 206 (indicating larger aspect ratios), the pit depth and/or width remain smaller than the limit 206 (indicating smaller pits), the number of pits being no greater than the limit 206, and/or the inverse value of the distances between pits remaining below the limit 206 (indicating pits that are farther apart), etc. In the illustrated example, the analysis controller 102 would not implement a remediation action while the characteristic 200 remains at or below the limit 206.

But, the analysis controller 102 can proceed with automatically implementing a remediation action responsive to a rate in change of one or more of these characteristics 200 exceeding a designated rate limit. The analysis controller 102 can determine a rate of change 208 in the previously measured characteristics 200 and compare this rate of change 208 to the designated rate limit. If the rate of change 208 exceeds the designated rate limit, then the rate of change 208 can indicate that corrosion of the equipment 104 is worsening at a rapid rate, even though the individual characteristics 200 of the corrosion do not alone indicate a need to remediate the corrosion.

As another example, the analysis controller 102 can examine historical operational settings or characteristics of the equipment 104 to determine whether to implement a remediation action. The historical operational settings or characteristics can indicate what speeds the equipment 104 operated at, the temperatures and/or humidity levels in which the equipment 104 operated, and/or locations or routes where the equipment 104 previously traveled. These historical operational settings can be examined along with the measured corrosion characteristics to determine whether remediation of the corrosion should be performed. For example, the corrosion in equipment 104 may be increasing, but the corrosion characteristics and/or rate of change 208 in the corrosion characteristics may not be sufficiently bad to cause the analysis controller 102 to implement a remediation action.

The equipment 104, however, may not have been operating in conditions that would otherwise be associated with increasing corrosion. For example, the equipment 104 may have been operating at low speeds, low temperatures, low levels of humidity, and/or at locations or along routes with low amounts of dust or other particulates. But, the corrosion measured in the equipment 104 may be otherwise associated with equipment 104 operating at faster speeds, in hotter temperatures, in higher humidity levels, and/or along routes with increased amounts of dust. Therefore, corrosion in the equipment 104 may be worsening at a rate that is faster than expected given the operational conditions of the equipment 104. The analysis controller 102 can decide to implement the remediation action on the equipment 104 even though the corrosion characteristics and/or rate of growth 208 would otherwise not be sufficient to cause the analysis controller 102 to implement the remediation action.

The analysis controller 102 can examine or predict the efficacy of the remediation action implemented by the remediation system 106. For example, the degree of corrosion prior to the remediation action can be assessed using the sensor 110 by measuring one or more of the corrosion characteristics described herein. The degree of corrosion can be measured again by the sensor 110 after the remediation action implemented by the remediation system 106. The analysis controller 102 can determine how effective the remediation action was based on how the corrosion characteristics changed.

For example, the analysis controller 102 can determine and compare how corrosion characteristics on the equipment 104 change from before a remediation action was implemented to after the remediation action was implemented. If the maximum, average, or the like, of the volume, area, depth, width, etc. of the corrosion pits decreased, then the remediation action can be determined by the analysis controller 102 to be more effective than another remediation action that resulted in no decrease or a smaller decrease. If the minimum, average, or the like, of the distances between pits and/or the aspect ratios of the pits increased, then the remediation action can be determined by the analysis controller 102 to be more effective than another remediation action that resulted in no increase or a smaller increase. The analysis controller 102 can then select the more effective remediation actions for implementing for future determinations of when a remediation action is to be implemented.

The analysis controller 102 can create or modify a corrosion restoration or mitigation schedule based on the corrosion characteristics and/or the effectiveness of different remediation actions. For example, using the determinations of how effective the remediation actions are, the analysis controller 102 can schedule which remediation actions are performed and when the remediation actions are performed to increase residual or remaining useful lives of the equipment 104. The analysis controller 102 can schedule different remediation actions and/or more frequent remediation actions to increase the predicted residual lives of the equipment 104.

For example, the analysis controller 102 can create or modify such a remediation schedule based on a specified objective. For example, different remediation schedules can be generated for prolonging the residual life of the equipment 104, for improving performance of the equipment 104 (e.g., increase horsepower, increase fuel efficiency, etc.), or the like. The analysis controller 102 can obtain performance data from the equipment controller 108 to estimate the improved residual life achieved from the remediation actions performed on the equipment 104. Based on improvements to the performance of the equipment (e.g., fuel efficiency, vibrations, emission generation, etc.), the analysis controller 102 can determine whether to change the remediation schedule.

Another example of an objective is time periods between successive maintenance operations on the equipment 104. The time period between successive maintenance operations is the length of time between when the equipment 104 is maintained, such as how many days, weeks, or months pass between cleaning, repair, painting, or the like, of the equipment 104. The analysis controller 102 can modify the remediation schedule to increase the time period between successive maintenance operations. For example, the analysis controller 102 can select from among several different remediation actions based on which remediation action will prolong the useful life of the equipment 104 more than other remediation actions, which remediation action will extend the time period until the next maintenance operation (e.g., remediation action) is performed, or the like. Optionally, the analysis controller 102 can examine an existing maintenance schedule for the equipment 104 and select or schedule the remediation action based on which remediation action will not require additional maintenance on the equipment 104 until the next scheduled maintenance operation. For example, the equipment 104 may have a cleaning or inspection scheduled for a date that is four weeks from now. The analysis controller 102 can examine several remediation action options and determine that a first remediation action will not require additional maintenance on the equipment 104 for at least twelve weeks, a second remediation action will not require additional maintenance on the equipment 104 for at least six weeks, and a third remediation action will not require additional maintenance on the equipment 104 for at least twenty-four weeks. The analysis controller 102 can select (or schedule) the second remediation action as this remediation action will last for a time period that is closer to the next scheduled maintenance operation of the equipment 104, where additional remediation action(s) can be performed.

Another example of an objective is equipment reliability. Equipment reliability can be based on or represent a percentage or fraction of failures of equipment. Different reliabilities can be calculated based on how long the equipment is able to operate following a remediation action. For example, 55% of equipment may continue operating for at least thirty days after a water wash before failing, 70% of equipment may continue operating for at least thirty days after a foam wash before failing, and 90% of equipment may continue operating for at least thirty days after painting. These calculated reliabilities can be stored (e.g., in the database) and accessed by the analysis controller 102 in order to determine which remediation action to schedule or implement. For example, the analysis controller 102 can schedule the remediation action having the highest reliability or a reliability that is greater than one or more (but not all) other remediation actions.

As another example, if the fuel efficiency is decreasing or the vibrations generated by the equipment 104 is increasing (as communicated to the analysis controller 102 via the database 116 and/or an input device), then the analysis controller 102 can modify the remediation schedule to provide for more frequent and/or different remediation actions. If the fuel efficiency is not changing or the noise generated by the equipment 104 is remaining the same, then the analysis controller 102 can modify the remediation schedule to provide for less frequent and/or different remediation actions (e.g., to save cost and/or time in maintaining the equipment 104). The analysis controller 102 can modify the remediation schedule for the equipment 104 in order to improve or increase performance of the equipment 104 (e.g., relative to performance prior to modification of the remediation schedule), increasing usage time of the equipment (e.g., the time between performing remediation actions on the equipment 104) relative to usage time before modification of the remediation schedule, reduction of the overall cost of operation of the equipment 104, and/or reduction of remediation actions and/or maintenance costs to the owner or operator of the equipment 104.

The analysis controller 102 can determine individualized remediation schedules for individual pieces of equipment 104, and/or can determine fleet-wide remediation schedules based on the information described herein. The analysis controller 102 can communicate with the equipment controllers 108 of several different pieces of equipment 104 (e.g., turbine engines on the same or different aircraft) to obtain the operational characteristics of the different pieces of equipment 104. The analysis controller 102 can modify the remediation schedules for the various pieces of equipment 104 based on usages of the equipment 104. For example, the equipment 104 that is used more often, that operates at greater speeds and/or hotter temperatures, etc., may have remediation schedules with remediation implemented more often, while the equipment 104 that is used less often, that operates at slower speeds and/or cooler temperatures, etc., may have remediation schedules with remediation implemented less often.

In one embodiment, the equipment controller 108 can compare operating characteristics of the equipment 104 during operation of the equipment to an established or designated healthy equipment profile of operating characteristics. The healthy profile can be developed over time using model-based control algorithms. Based on the comparison of the operating characteristics to the healthy profile, the equipment controller 104 can predict or define the equipment health. For example, the equipment controller 108 can assign the equipment 104 with a low health score (e.g., two or three out of ten) responsive to the operating temperature, fuel efficiency, engine speed, etc. of the equipment 104 being a hotter temperature, lower efficiency, lower speed at the same throttle, etc., than the temperature, efficiency, speed, etc. of the healthy profile. The equipment controller 108 can assign the equipment 104 with a greater health score (e.g., seven or eight out of ten) responsive to the operating temperature, fuel efficiency, engine speed, etc. of the equipment 104 being the same as or better than the healthy profile. After the equipment 104 is built, the equipment 104 can be tested in a test cell to make sure that the equipment 104 meets performance requirements.

Operational characteristics and performance data for each piece of equipment 104 can be is acquired in a test cell and then incorporated into a model-based engine health monitoring algorithm. This algorithm can associate different operational characteristics of the equipment 104 with different states or conditions of the equipment 104. Operation of the equipment 104 in the field (e.g., on the wing of an aircraft) is measured and compared to the operation that is expected from the algorithm at a specific point in the life of the equipment 104 that is under consideration. For example, the turbine temperature and turbine component temperatures can be measured in a test cell and these measurements can be compared with subsequent on-wing temperature measurements. If the difference between the measurements obtained in the test cell and the measurements obtained on-wing exceeds certain prescribed values, then the equipment controller 108 can conclude that the turbine temperature is deteriorating over time, and the remediation action may be implemented. A trigger limit can be set for each parameter or combination of parameters that sets or is used to determine the need for restoration of the components of the equipment 104.

The database 116 can store availability information of different remediation actions. This information can indicate which remediation actions are available at different locations, which personnel that implement the remediation actions are available at different locations, etc. This information can be used by the analysis controller 102 to determine which remediation action to implement. For example, the analysis controller 102 may select washing the equipment 104 to remove a corrosive species instead of applying a coating additive to the equipment 104 if the coating system used to spray the coating additive is not available in the location of the equipment 104.

The analysis controller 102 can coordinate remediation actions with other schedules of the equipment 104. For example, the analysis controller 102 may determine that the equipment 104 needs a remediation action to be performed based on the corrosion characteristic(s) and/or the operational characteristic(s) procedure. But, if the equipment 104 is scheduled for other maintenance, the analysis controller 102 may delay implementation of the remediation action until the other maintenance is performed to avoid additional time periods where the equipment 104 is out of service.

As another example, the analysis controller 102 may determine that the equipment 104 needs a remediation action to be performed based on the corrosion characteristic(s). But, the analysis controller 102 may delay implementation of the remediation action until the equipment 104 is stationary at a location for a sufficiently long time to allow for the implementation of the remediation action. For example, the analysis controller 102 can schedule remediation during a time that an aircraft is scheduled to be stationary between trips.

The analysis controller 102 can examine historical data on the corrosion characteristics, the operational characteristics, operational data of the equipment, and the remediation actions that were implemented to determine remediation cycle times. For example, the analysis controller 102 can examine how often remediation actions were needed, how quickly the corrosion of the equipment 104 progressed between remediation actions, performance of the equipment 104 before and/or after remediation actions (e.g., horsepower output, fuel efficiency, noise, etc.), or other historical data. The analysis controller 102 can determine that the remediation actions need to be performed more or less often based on this historical data in order to improve performance of the equipment 104 without taking the equipment 104 out of service for too long of time periods. The analysis controller 102 can determine how often remediation actions are to be performed on a category or type of equipment 104 (e.g., a turbine engine having the same model number) based on this historical data, and schedule remediation actions for the same type of equipment 104 based on this determination.

For example, the analysis controller 102 can determine that a first remediation action (e.g., washing the equipment 104) may have a shorter cycle time than a different, second remediation action (e.g., applying paint to the equipment 104) due to the rate of corrosion growth being faster after implementing the first remediation action when compared to the second remediation action. If the first remediation action is implemented on the equipment 104, the analysis controller 102 can schedule a follow-up remediation action for the equipment 104 sooner than if the second remediation action was implemented.

In one embodiment, the analysis controller 102 can predict growth of the corrosion on one or more parts of the equipment 104. This growth can be represented or quantified by a change in one or more corrosion characteristics, such as a 20% increase in pit depth, a 20% increase in pit width, a 20% decrease in pit aspect ratio, a 20% decrease in pit spacing (e.g., distances between pits), etc. The analysis controller 102 can obtain or receive (e.g., from a schedule of upcoming travel of a vehicle that includes the equipment 104, from operator input, etc.) forthcoming operational characteristics of the equipment 104. These characteristics can include planned throttle settings, planned horsepower outputs, expected ambient temperatures and/or humidity, and the like, for upcoming operation of the equipment 104. These characteristics can be obtained from scheduled operations of the equipment 104, which may dictate the throttle settings, outputs, and/or routes to be traveled by the equipment 104. The ambient conditions (e.g., temperature and/or humidity) can be obtained by reference to weather forecasts for the routes scheduled to be traveled by the equipment 104. The analysis controller 102 can compare the forthcoming (e.g., expected or planned) operational characteristics with designated or required operational characteristics.

The different designated operational characteristics can be associated with different rates of corrosion growth (e.g., in a memory such as the database 116). For example, greater designated throttle settings, hotter expected temperatures, increased expected humidity, greater amounts of dust in a route planned for upcoming travel, etc., can be associated in the database 116 with larger increases in the expected rate of corrosion growth than smaller designated throttle settings, cooler expected temperatures, decreased expected humidity, lesser amounts of dust in a route planned for upcoming travel, etc. The analysis controller 102 can determine which designated operational characteristics match or are closer to the forthcoming operational characteristics (e.g., closer than one or more other designated operational characteristics). The rate of corrosion growth associated with this or these designated operational characteristics can be identified by the analysis controller 102 as predicted corrosion growth. The analysis controller 102 can then inform an operator (e.g., via an output device such as a display, a speaker, or the like) of the predicted rate of corrosion growth and/or the expected corrosion characteristics after the predicted corrosion growth. The analysis controller 102 optionally can automatically schedule one or more remedial actions to be implemented based on the expected corrosion growth so that the remedial action(s) is implemented before the corrosion growth exceeds one or more thresholds.

Figure 3:
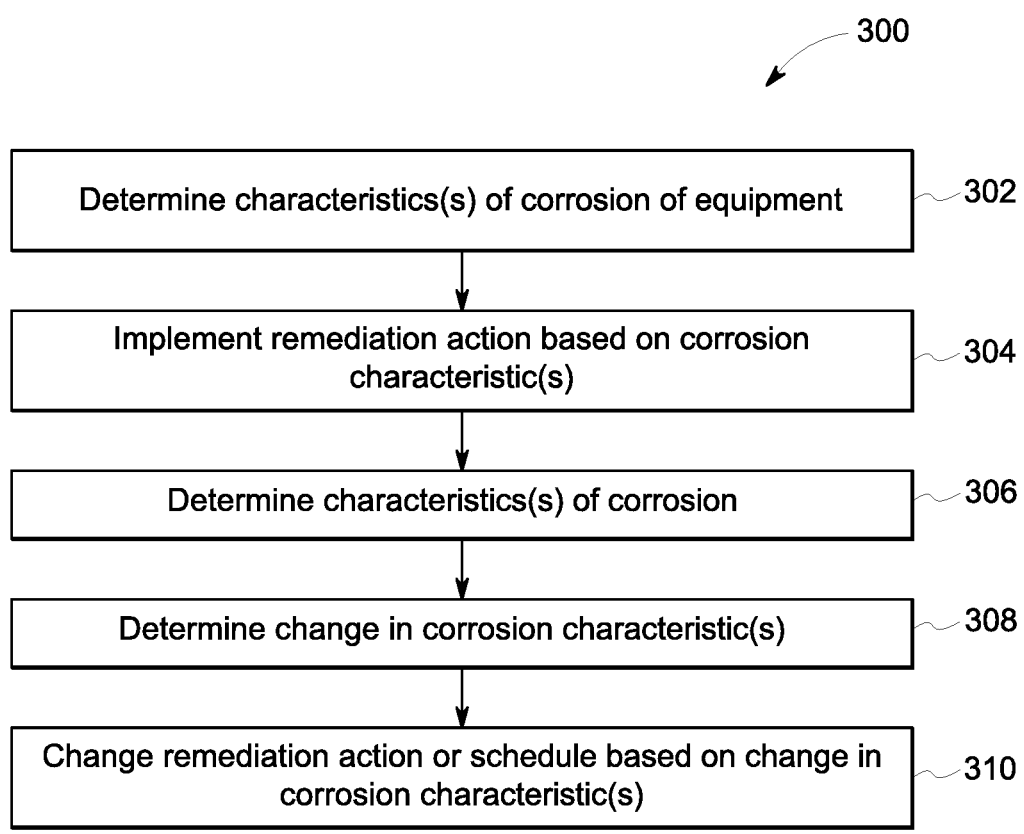
FIG. 3 illustrates a flowchart of one embodiment of a method for monitoring corrosion in equipment.

FIG. 3 illustrates a flowchart of one embodiment of a method 300 for monitoring corrosion in equipment. The method 300 can represent some or all the operations performed by the system 100 described above to monitor corrosion in the equipment 104, to determine which remediation action(s) to implement to repair, reduce, or remove corrosion in the equipment 104, to implement the remediation action(s), to determine how effective the remediation action was, and/or to change a schedule for upcoming remediation actions.

At 302, one or more characteristics of corrosion in equipment are determined. As described above, these characteristics can be measured depths, widths, aspect ratios, distances between pits, volumes of pits, etc. At least some of these characteristics can be multi-dimensional characteristics in that the characteristics are measured in two or more directions or dimensions for each corrosion pit that is examined.

At 304, a remediation action is selected and implemented based on the corrosion characteristics. In one embodiment, the remediation action can be selected for implementation responsive to one or more of the corrosion characteristics exceeding a designated threshold (e.g., the pit depth, width, and/or volume exceeding an associated designated threshold) or falling below another designated threshold (e.g., the pit aspect ratio and/or pit volume falling below a different associated threshold). Optionally, the remediation action can be selected for implementation responsive to a rate of change in the corrosion characteristic(s) exceeding a designated rate of change, as described above.

In one embodiment, the remediation action that is selected can be chosen from among many different remediation actions based on availability information of the different remediation actions. This information can indicate which remediation actions are available at different locations, which personnel that implement the remediation actions are available at different locations, etc. Optionally, the remediation action that is selected can be coordinated with a schedule of the equipment. For example, a determination may be made that the equipment needs a remediation action to be performed based on the corrosion characteristic(s) and/or the operational characteristic(s) of the equipment. But, if the equipment is scheduled for other maintenance, the analysis controller may delay implementation of the remediation action until the other maintenance is performed to avoid additional time periods where the equipment is out of service.

At 306, one or more characteristics of corrosion in equipment are determined. The characteristics can be determined after implementation of the remediation action. In one embodiment, the same characteristics are determined for the same equipment at 302 and 306.

At 308, a change in one or more of the corrosion characteristics is determined. The characteristics are determined after completion of the remediation action in order to examine how effective the remediation action was in reducing or eliminating corrosion in the equipment. For example, the efficacy of the remediation action that was implemented can be quantified by assessing the degree of corrosion prior to the remediation action via measuring one or more of the corrosion characteristics described herein. The degree of corrosion can be measured again after the remediation action to determine how effective the remediation action was based on how the corrosion characteristics changed. If the maximum, average, or the like, of the volume, area, depth, width, etc. of the corrosion pits decreased, then the remediation action can be determined to be more effective than another remediation action that resulted in no decrease or a smaller decrease. If the minimum, average, or the like, of the distances between pits and/or the aspect ratios of the pits increased, then the remediation action can be determined to be more effective than another remediation action that resulted in no increase or a smaller increase.

At 310, a remediation action or schedule is changed based on the change in the corrosion characteristics. A corrosion restoration or mitigation schedule can be modified based on the corrosion characteristics and/or the effectiveness of different remediation actions. For example, using the determinations of how effective the remediation actions are, the analysis controller can schedule which remediation actions are performed and when the remediation actions are performed to increase residual or remaining useful lives of the equipment. Different remediation actions and/or more frequent remediation actions can be scheduled to increase the predicted residual lives of the equipment.

Optionally, the remediation schedule can be changed to achieve a specified objective. For example, different remediation schedules can be generated for prolonging the residual life of the equipment, for improving performance of the equipment, or the like (as described above). The schedule that is determined may be determined for an individual piece of equipment, or can be determined for many pieces of equipment (e.g., a fleet-wide schedule). Optionally, the schedule can be modified based on operational characteristics of the equipment, such as how often equipment is used, the speeds and/or temperatures at which the equipment operates, etc.

In one embodiment, the remediation schedule is modified based on a remediation cycle time. For example, a determination as to how often remediation actions are needed, how quickly the corrosion of the equipment progressed between remediation actions, performance of the equipment before and/or after remediation actions, other historical data, etc., can be performed. The remediation actions may need to be performed more or less often based on this historical data in order to improve performance of the equipment without taking the equipment out of service for too long of time periods. The analysis controller 102 can determine how often remediation actions are to be performed on a category or type of equipment 104 based on this historical data, and can schedule remediation actions for the same type of equipment 104 based on this determination. This frequency at which remediation actions are needed can be used to modify or create the remediation schedule.

In one embodiment, a method includes measuring one or more characteristics of corrosion in equipment before and after implementation of a corrosion remediation action, determining one or more of a change in the one or more characteristics of the corrosion between before and after implementation of the corrosion remediation action, one or more historical operational characteristics of the equipment, or one or more forthcoming operational characteristics of the equipment, and modifying a schedule of the corrosion remediation action for the equipment based on one or more of the one or more characteristics of corrosion that are measured, the change in the one or more characteristics of the corrosion, the one or more historical operational characteristics of the equipment, and/or the one or more forthcoming operational characteristics of the equipment.

Optionally, the method includes implementing (e.g., automatically) the corrosion remediation action on the equipment.

Optionally, the one or more characteristics of the corrosion in the equipment include one or more multi-dimensional characteristics of corrosion pits in the equipment.

Optionally, the corrosion remediation action includes one or more of washing the equipment or applying a paint or other coating to the equipment.

Optionally, the method includes determining a rate of change in the one or more characteristics of the corrosion as the change in the one or more characteristics of the corrosion, and wherein the schedule is modified based on the rate of change.

Optionally, the method includes determining the one or more historical operational characteristics as one or more of previous settings of the equipment, previous speeds at which the equipment operated, previous temperatures in which the equipment operated, previous humidity levels in which the equipment operated, or previous amounts of dust in which the equipment operated, and wherein the schedule is modified based on the one or more historical operational characteristics of the equipment.

Optionally, the schedule of the corrosion remediation action also is modified based on an operational objective of the equipment.

Optionally, the operational objective of the equipment includes a limit in one or more of a fuel efficiency of the equipment or emissions generated by the equipment.

Optionally, the schedule of the corrosion remediation action is modified for a fleet of equipment that includes the equipment for which the one or more characteristics of corrosion were measured.

Optionally, modifying the schedule includes one or more of determining availability of different remediation actions that includes the corrosion remediation action or delaying a scheduled instance of the corrosion remediation action based on availability of the equipment.

Optionally, the method also includes determining upcoming growth in the corrosion in the equipment based on the one or more characteristics of the corrosion that are measured and forthcoming operational characteristics of the equipment, where the schedule is modified based also on the upcoming growth in the corrosion.

Optionally, the schedule of the corrosion remediation action for the equipment is modified to increase a time period between successive corrosion remediation actions in the schedule.

In one embodiment, a system includes one or more processors configured to obtain measurements of one or more characteristics of corrosion in equipment before and after implementation of a corrosion remediation action. The one or more processors also are configured to determine one or more of a change in the one or more characteristics of the corrosion between before and after implementation of the corrosion remediation action, one or more historical operational characteristics of the equipment, and/or one or more forthcoming operational characteristics of the equipment. The one or more processors are configured to modifying a schedule of the corrosion remediation action for the equipment based on one or more of the one or more characteristics of corrosion that are measured, the change in the one or more characteristics of the corrosion, the one or more historical operational characteristics of the equipment, and/or the one or more forthcoming operational characteristics of the equipment.

Optionally, the one or more processors are configured to determine a rate of change in the one or more characteristics of the corrosion as the change in the one or more characteristics of the corrosion, where the one or more processors are configured to modify the schedule based on the rate of change.

Optionally, the one or more processors also are configured to determine the one or more historical operational characteristics as one or more of previous settings of the equipment, previous speeds at which the equipment operated, previous temperatures in which the equipment operated, previous humidity levels in which the equipment operated, and/or previous amounts of dust in which the equipment operated. The one or more processors can be configured to modify the schedule based on the one or more historical operational characteristics of the equipment.

Optionally, the one or more processors are configured to modify the schedule of the corrosion remediation action also based on a limit on one or more of a fuel efficiency of the equipment, audible noise generated by the equipment, and/or emissions generated by the equipment.

Optionally, the one or more processors are configured to determine upcoming growth of the corrosion in the equipment based on the one or more characteristics of the corrosion that are measured and forthcoming operational characteristics of the equipment, where the one or more processors are configured to modify the schedule based also on the upcoming growth that is determined.

In one embodiment, a method includes measuring one or more characteristics of corrosion in equipment before and after implementation of a corrosion remediation action, determining a change in the one or more characteristics of the corrosion between before and after implementation of the corrosion remediation action, determining upcoming growth of the corrosion in the equipment based on the one or more characteristics of the corrosion that are measured and forthcoming operational characteristics of the equipment, and modifying a schedule of the corrosion remediation action for the equipment based on the upcoming growth of the corrosion that is determined and the forthcoming operational characteristics of the equipment.

Optionally, the method also includes implementing the corrosion remediation action on the equipment.

Optionally, the one or more characteristics of the corrosion in the equipment include one or more multi-dimensional characteristics of corrosion pits in the equipment.

Optionally, the method includes determining a rate of change in the one or more characteristics of the corrosion as the change in the one or more characteristics of the corrosion, and wherein the schedule is modified based on the rate of change.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising"

and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   measuring one or more characteristics of corrosion in equipment before implementation of a corrosion remediation action;
   reducing or repairing the corrosion in the equipment by implementing the corrosion remediation action;
   measuring the one or more characteristics of the corrosion in the equipment after implementation of the corrosion remediation action;
   determining a change in the one or more characteristics of the corrosion in the equipment between before and after the implementation of the corrosion remediation action, based on one or more historical operational characteristics of the equipment, or one or more forthcoming operational characteristics of the equipment, wherein the one or more historical operational characteristics including one or more of a previous setting of the equipment, a previous speed at which the equipment operated, a previous temperature in which the equipment operated, a previous humidity level in which the equipment operated, or a previous amount of dust in which the equipment operated, and wherein the one or more forthcoming operational characteristics including one or more of a planned throttle setting of the equipment, a planned horsepower output of the equipment, an expected ambient temperature, or an expected humidity; and
   modifying a schedule of one or more forthcoming instances of the corrosion remediation action for the equipment based on one or more of:
   the one or more characteristics of the corrosion in the equipment that are measured, the change in the one or more characteristics of the corrosion in the equipment, the one or more historical operational characteristics of the equipment, or the one or more forthcoming operational characteristics of the equipment.

2. The method of claim 1, wherein the one or more characteristics of the corrosion in the equipment include one or more multi-dimensional characteristics of corrosion pits in the equipment.

3. The method of claim 1, wherein the corrosion remediation action includes one or more of washing the equipment or applying a paint or other coating to the equipment.

4. The method of claim 1, wherein the method includes determining a rate of change in the one or more characteristics of the corrosion as the change in the one or more characteristics of the corrosion, and wherein the schedule is modified based on the rate of change.

5. The method of claim 1, wherein the schedule of the one or more forthcoming instances of the corrosion remediation action is modified based on an operational objective of the equipment.

6. The method of claim 5, wherein the operational objective of the equipment includes a limit in one or more of a fuel efficiency of the equipment or emissions generated by the equipment.

7. The method of claim 1, wherein the schedule of the one or more forthcoming instances of the corrosion remediation action is modified for a fleet of equipment that includes the equipment for which the one or more characteristics of corrosion were measured, the schedule modified for the fleet based on the one or more characteristics of the corrosion in the equipment, the change in the one or more characteristics of the corrosion in the equipment, the one or more historical operational characteristics of the equipment, or the one or more forthcoming operational characteristics of the equipment.

8. The method of claim 1, wherein modifying the schedule includes one or more of determining availability of different remediation actions that includes the corrosion remediation action or delaying a scheduled instance of the corrosion remediation action based on availability of the equipment.

9. The method of claim 1, further comprising determining upcoming growth in the corrosion in the equipment based on the one or more characteristics of the corrosion that are measured and the one or more forthcoming operational characteristics of the equipment, wherein the schedule is modified based on the upcoming growth in the corrosion.

10. The method of claim 1, wherein the schedule of the one or more forthcoming instances of the corrosion remediation action for the equipment is modified to increase a time period between successive corrosion remediation actions in the schedule.

11. A system comprising one or more processors configured to:
   obtain a measurements of one or more characteristics of corrosion in equipment before implementation of a corrosion remediation action,
   control one or more reduction or repairs of the corrosion in the equipment by implementing the corrosion remediation action,
   obtain an additional measurement of the one or more characteristics of the corrosion after the implementation of the corrosion remediation action,
   determine a change in the one or more characteristics of the corrosion between before and after the implementation of the corrosion remediation action, based on the one or more historical operational characteristics of the equipment, or one or more forthcoming operational characteristics of the equipment, wherein the one or more historical operational characteristics including one or more of a previous setting of the equipment, a previous speed at which the equipment operated, a previous temperature in which the equipment operated, a previous humidity level in which the equipment operated, or a previous amount of dust in which the equipment operated, and wherein the one or more forthcoming operational characteristics including one or more of a planned throttle setting of the equipment, a planned horsepower output of the equipment, an expected ambient temperature, or an expected humidity, and modify a schedule of one or more forthcoming instances of the corrosion remediation action for the equipment based on one or more of:

the one or more characteristics of the corrosion in the equipment that are measured, the change in the one or more characteristics of the corrosion in the equipment, the one or more historical operational characteristics of the equipment, or the one or more forthcoming operational characteristics of the equipment.

12. The system of claim 11, wherein the one or more processors are configured to determine a rate of change in the one or more characteristics of the corrosion as the change in the one or more characteristics of the corrosion, and wherein the one or more processors are configured to modify the schedule based on the rate of change.

13. The system of claim 11, wherein the one or more processors are configured to modify the schedule of the one or more forthcoming instances of the corrosion remediation action based on a limit on one or more of a fuel efficiency of the equipment, audible noise generated by the equipment, or emissions generated by the equipment.

14. The system of claim 11, wherein the one or more processors are configured to determine upcoming growth of the corrosion in the equipment based on the one or more characteristics of the corrosion that are measured and the one or more forthcoming operational characteristics of the equipment, wherein the one or more processors are configured to modify the schedule based on the upcoming growth that is determined.

15. A method comprising:

measuring one or more characteristics of corrosion in equipment before implementation of a corrosion remediation action;

reducing or repairing the corrosion in the equipment by implementing the corrosion remediation action;

measuring the one or more characteristics of the corrosion in the equipment after the implementation of the corrosion remediation action;

determining a change in the one or more characteristics of the corrosion in the equipment between before and after the implementation of the corrosion remediation action;

determining upcoming growth of the corrosion in the equipment based on the one or more characteristics of the corrosion that are measured and forthcoming operational characteristics of the equipment that include one or more of a planned throttle setting, a planned horsepower output, an expected ambient temperature, or an expected humidity; and modifying a schedule of one or more forthcoming instances of the corrosion remediation action for the equipment based on the upcoming growth of the corrosion that is determined and the forthcoming operational characteristics of the equipment.

16. The method of claim 15, wherein the one or more characteristics of the corrosion in the equipment include one or more multi-dimensional characteristics of corrosion pits in the equipment.

17. The method of claim 15, wherein the method includes determining a rate of change in the one or more characteristics of the corrosion as the change in the one or more characteristics of the corrosion, and wherein the schedule is modified based on the rate of change.

* * * * *